June 13, 1967  HIDEO MIYAUCHI  3,324,780
ZOOM LENS CONTROL
Filed Oct. 3, 1963
2 Sheets-Sheet 1
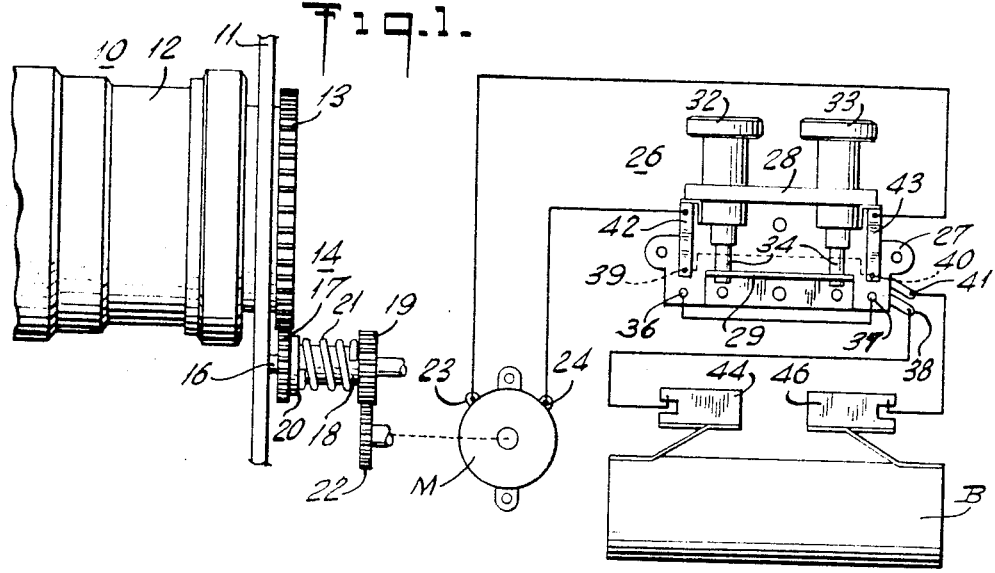
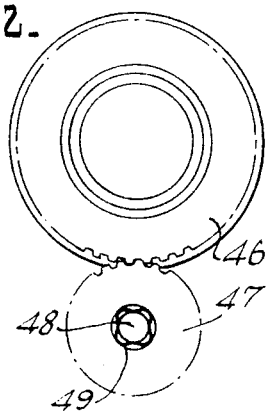
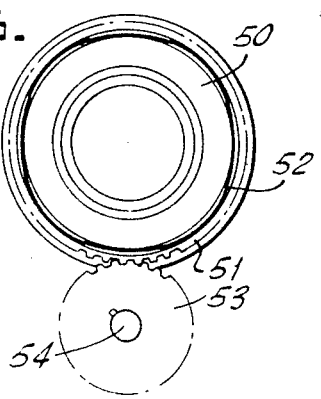
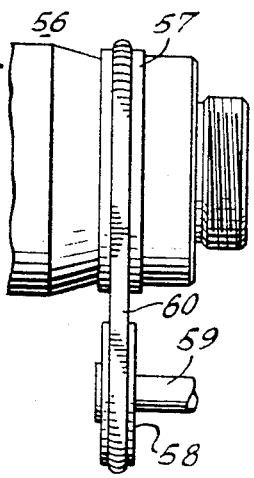
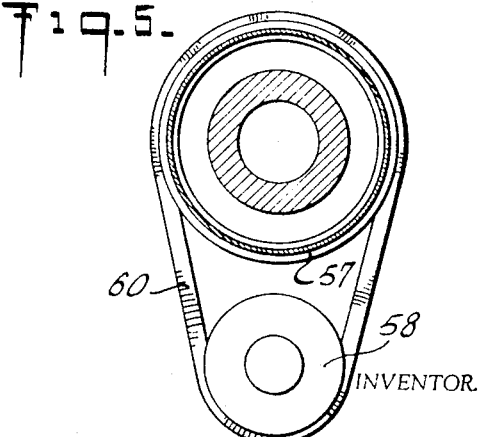
INVENTOR.
HIDEO MIYAUCHI
BY Stanley Wolder
ATTORNEY

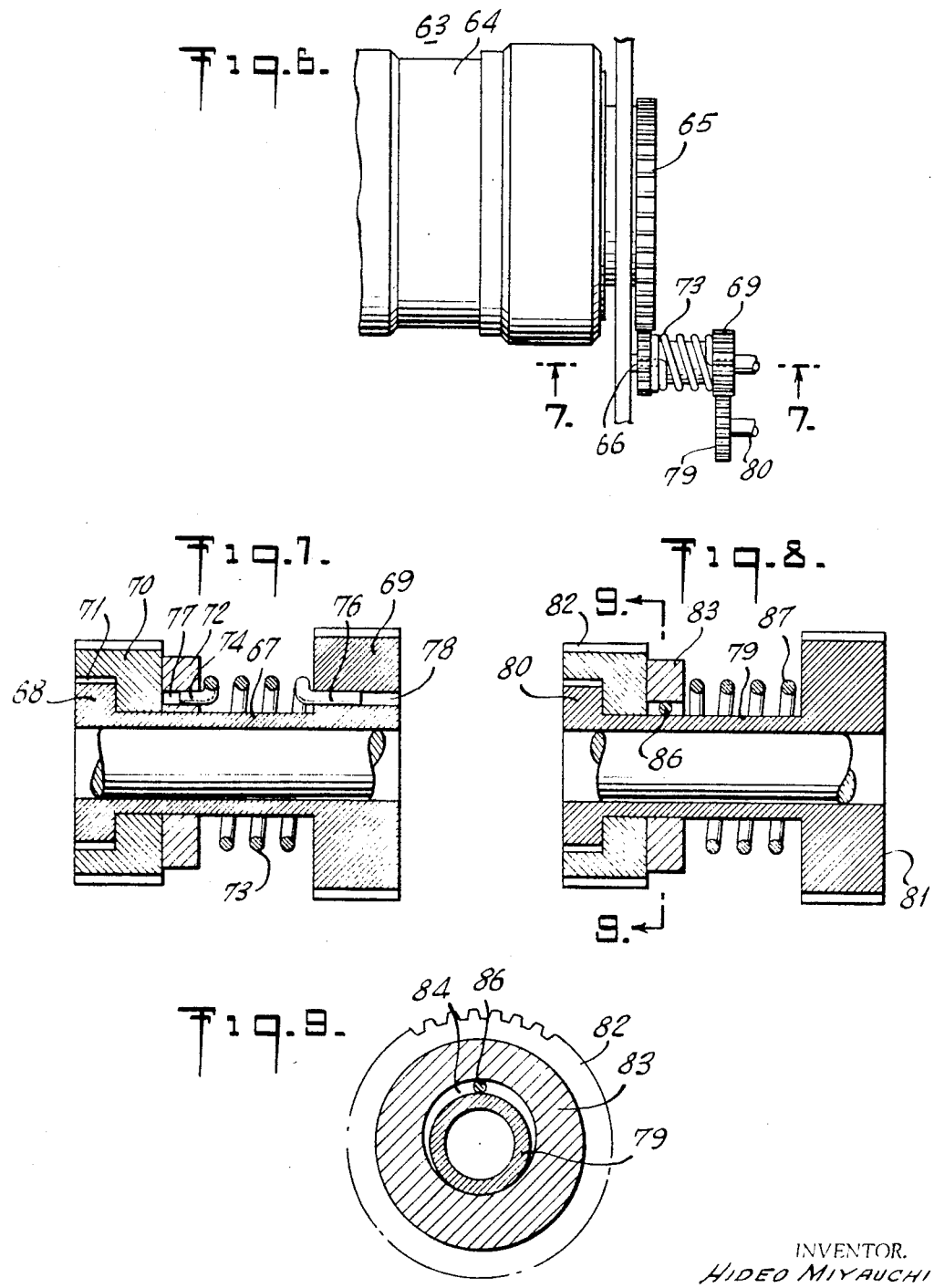

3,324,780
ZOOM LENS CONTROL
Hideo Miyauchi, Okaya-shi, Nagano-ken, Japan, assignor to Kabushiki Kaisha Yashica, Tokyo, Japan, a corporation of Japan
Filed Oct. 3, 1963, Ser. No. 313,567
Claims priority, application Japan, Nov. 7, 1962, 37/66,501; Nov. 17, 1962, 37/68,857, 37/68,858
6 Claims. (Cl. 95—45)

The present invention relates generally to improvements in lens control mechanisms and it relates more particularly to an improved mechanism for controlling the focal length of a zoom lens.

In a zoom lens the focal length or angle of view is varied by adjusting the relative axial positions of the optical elements of the zoom lens system. This is generally accomplished by mounting one of the elements for relative axial movement, the element being provided with a linearly movable follower which engages a helicoidal cylindrical cam in the form of a sleeve. An externally accessible control ring is mounted on the lens barrel and connected to the helicoidal cam to facilitate the rotation thereof and hence the adjustment of the zoom lens focal length. The control ring may be manually adjusted or may be selectively driven by an electric or a spring wound motor. In any event, stops or abutments are provided at the extreme positions of the adjustable lens element or the associated control mechanism so as to limit the movement thereof. As a consequence, in the adjustment of the conventional zoom lens to either of its extreme positions there is an abrupt engagement by a stop element which results in a mechanical shock being imparted to the zoom lens with its undesirable consequences. Camera lens systems are, at their best, highly sensitive devices which can be easily damaged by mechanical shock and such shock should be assiduously avoided.

It is therefore, a principal object to provide an improved lens control system.

Another object of the present invention is to provide an improved zoom lens focal length control mechanism.

Still another object of the present invention is to provide an improved zoom lens focal length control mechanism in which mechanical shock attendant to the adjustment of the lens to extreme positions is minimized or obviated.

A further object of the present invention is to provide an improved electrical network for the adjustment of zoom lenses.

Still a further object of the present invention is to provide an improved mechanism of the above nature characterized by its simplicity, ruggedness and reliability.

The above and other objects of the present invention will become apparent from a reading of the following description taken in conjunction with the accompanying drawings, wherein:

FIGURE 1 is a front fragmentary partially schematic view of a zoom lens control mechanism embodying the present invention;

FIGURE 2 is an end view of the coupling mechanism of another embodiment of the present invention;

FIGURE 3 is a view similar to FIGURE 2 of still another embodiment of the present invention;

FIGURE 4 is a side fragmentary view of a further embodiment of the present invention;

FIGURE 5 is an end view thereof;

FIGURE 6 is a side fragmentary view of another embodiment of the present invention;

FIGURE 7 is a sectional view taken along line 7—7 in FIGURE 6;

FIGURE 8 is a longitudinal sectional view of a modified form of a coupling mechanism; and FIGURE 9 is a sectional view taken along line 9—9 in FIGURE 8.

In a sense the present invention contemplates the provision of a lens control system comprising a zoom lens including a barrel provided with a rotary, lens control member, a rotary drive member, and torque limiting means coupling said control member and said drive member. Another feature of the present invention resides in the drive system which includes a reversible direct current electric motor connected to said control member and including a pair of input terminals, a source of direct current, a switch including a pair of first contact members connected to opposite poles of said current source and a pair of second contact members connected to said motor terminals and each being movable to positions in alternative engagement with said first contact elements, and selectively actuable means for controlling said positions of said second contact members.

Referring now to the drawings and particularly FIGURE 1 thereof which illustrates a preferred embodiment of the present invention, the reference numeral 10 generally designates a camera zoom lens which is mounted in a suitable manner on the front wall 11 of an associated camera. The zoom lens 10 is of any conventional construction which includes a lens barrel 12 housing a lens system provided with an axially adjustably lens which varies the focal lens or the zoom lens 10. The mechanism for controlling the position of the axially adjustable lens usually includes a helicoidal cam in the form of a sleeve having a helical track formed therein, the adjustable lens carrying a follower engaging the helical track, and a central ring connected to the cam, so that rotation of the control ring effects the rotation of the helical cam and the axial adjustment of the lens. In the present embodiment, the lens focal length or zoom control ring is defined by an annular gear 13 coaxial with, and mounted at the inner end of the lens barrel 12.

The control gear 13 is connected through a torque limiting slipping clutch mechanism 14 to the shaft of a drive motor M. The clutch 14 is mounted on a shaft 16 supported by the wall 11 and includes a first gear 17 journalled on the shaft 16 and engaging the control gear 13. Also journalled on the shaft 16 is a sleeve shaft 18 having affixed to its trailing end a second gear 19. A friction annulus or washer 20 registers with the sleeve shaft 18 and bears on the end face of the gear 17, being urged thereto by a helical spring 21 entrapped between the confronting faces of the annulus 20 and second gear 19. Thus upon rotation of the second gear 19 the first gear 17 is rotated by the frictional drive of the spring 21 by the gear 19, the annulus 20 by the spring 21, and the gear 17 by the annulus 20. In the event of an excessive torque or load impeding the rotation of the gear 17 slipping occurs either between the gear 17 and annulus 20, between annulus 20 and spring 21 or between spring 21 and gear 19. The gear 19 is engaged by a gear 22 mounted on the drive shaft of the motor M.

The motor M is a direct current reversible motor which includes a pair of input terminals 23 and 24 and the direction of rotation of the motor M depends on the direction of the input current. In order to control the application of current to the motor M and the direction of the current, the motor M is connected to a battery B by way of an actuating and reversing switch 26. The switch 26 includes a base plate 27 carrying a pair of spaced parallel bracket plates 28 and 29. Supported by the bracket plate 28 is a pair of spaced depressible push buttons 32 and 33 which are normally biased to their raised positions by compression springs housed in the hollow shanks of the push buttons 32 and 33 and engaged by posts 34 projecting from the bracket plate 29 coaxial with the push buttons 32 and 33. The switch 26 is mounted on the body of the camera with the push buttons 32 and 33 being conveniently accessible for finger manipulation.

Mounted on the switch base 27 is a first pair of spaced contact elements 36 and 37 which are electrically connected to define a contact member which in turn is connected to a first lug 38. Also mounted in the switch base 27 is a second pair of spaced contact elements 39 and 40 in alignment with corresponding of the first contact elements 36 and 37 connected together to define another contact member which is connected to a second lug 41. Mounted on the shank of each of the push buttons 32 and 33 by means of suitable brackets are wiper or arm contact members 42 and 43 of any suitable configuration and construction to be movable by manipulation of the push buttons 32 and 33 into alternative engagement with the contact elements 36 and 39, and 37 and 40. Thus in the normal push button raised positions the arms 42 and 43 engage only the contact elements 39 and 40 and upon depression of the push button 32 the arm 42 engages only contact element 36 and upon depression of the push button 33 the arm 43 engages only the contact element 37. The lugs 38 and 41 are connected to terminals 44 and 46 which releasably engage the poles of the battery B and the contact arms 42 and 43 are suitably connected to the drive motor terminals 23 and 24 respectively.

Considering now the operation of the apparatus described above, in the normal dormant position of the zoom control mechanism, the push buttons 32 and 33 are in their raised position, the contact arms 42 and 43 are in engagement with interconnected contact elements 39 and 40 to short the motor terminals 23 and 24 and open the battery terminals 44 and 46. Upon depression of the push button 32, the control arm 42 is switched from contact element 39 to contact element 36 so that the motor terminal 23 is connected to battery terminal 46 and motor terminal 24 is connected to battery terminal 44 to energize the motor M and rotate it in a first or forward direction. The motor M thus drives the zoom control gear 13 by way of the gear 22 and coupling clutch 14. Upon release of the push button 32 the contact arm 42 returns to engagement with the contact element 39 returning the motor M to its deenergized position and brake the motor M by reason of the shorting of the terminals 23 and 24 by the connected contact elements 39 and 40. By depressing the push button 33 the motor terminals 23 and 24 are coupled respectively to battery terminals 44 and 46 to drive the motor M in a reverse direction and correspondingly actuate the control gear 13. Thus the zoom lens 10 may be rapidly adjusted in focal length in either direction. In the event that the axially movable lens reaches the end of its stroke in either direction to halt the control gear 13, with the continuing rotation of the motor M the clutch 14 slips as aforesaid to prevent or minimize any mechanical shock and hence obviate any damage as a result thereof. It should be noted that if both push buttons 32 and 33 are depressed the motor terminals will be shorted and the circuit between the battery terminals opened.

In FIG. 2 of the drawing there is illustrated a modified mechanism which may be employed to advantage for coupling the drive means to the zoom lens control ring. Specifically the zoom control ring is defined by an annular gear 46 which is engaged by a gear 47. The gear 47 has an axial bore formed therein of greater diameter than and registering with a shaft 48. A collar 49 formed of a resilient flexible material such as spring steel or the like engages the shaft 48 and the inner surface of the gear 47 and has an undulating periphery including outwardly directed ribs bearing on the inner peripheral face of the gear 47 and inwardly directed ribs bearing on the shaft 48 to effect a torque limiting slipping coupling between the shaft 48 and the gear 47.

The shaft 48 is advantageously motor driven as in the earlier described embodiment or may be manually rotated. The operation of the mechanism is similar to that first set forth. Upon the axially adjustable lens reaching a limit of its stroke, further rotation of the shaft 48 effects a slipping between the shaft 48 and the gear 47 by reason of the friction collar 49 so as to limit the transmitted torque and the attendant mechanical shock.

The torque limiting drive coupling illustrated in FIGURE 3 of the drawings differs from that last described primarily in the disposition of the friction coupling collar. Particularly, the axially adjustable zoom lens is controlled by a ring 50 with which an externally toothed ring gear 51 coaxially registers and includes an inner face spaced from the control ring 50. A resilient, flexible friction collar 52 is entrapped between the confronting peripheral faces of the gear 51 and ring 50 and is provided with inwardly and outwardly bowed ribs bearing on the respective peripheral surfaces. A gear 53 engages the gear 51 and is keyed to a drive or control shaft 54. The operation of the present device differs from that last described in that the transmission torque is limited by the slipping of the friction coupling collar 52 between the confronting faces of the ring 50 and gear 51.

In the embodiment of the present invention illustrated in FIGURES 4 and 5 of the drawing, the transmission torque is limited by a slipping belt coupling. The zoom lens 56 includes a zoom lens control ring defined by a pulley 57 registering with the lens barrel. Radially spaced from the pulley 57 is a second pulley 58 which is affixed to the end of a drive shaft 59 which may be connected to a drive motor or may be hand rotated. The pulleys 57 and 58 are coupled by an endless slipping type belt 60 of any conventional construction, advantageously a resilient extendable helical spring belt. In operation, mechanical shock attendant to the extreme adjustments of the zoom lens 56 is minimized by reason of the torque limiting transmission between the pulleys 58 and 47. An excessive retarding force on the pulley 57 will result in the slipping of the belt 60 allowing the corresponding rotation of the pulley 58.

While the coupling mechanism 14 illustrated in FIGURE 1 of the drawings normally operates satisfactorily, by reason of the presence of three friction interfaces in the torque transmission, that between the spring 17 and the annulus 20 and the gear 19, and between the annulus 20 and gear 17, a variation in maximum torque transmission may vary with time. This variation in operating characteristics is greatly reduced by use of the coupling arrangement illustrated in FIGURES 6 and 7 of the drawing. In this last embodiment, the zoom lens 63 includes a lens barrel 64 on which is mounted a zoom lens control ring defined by a gear 65.

An axle 66 is supported below the gear 65 and is parallel to the axis of rotation thereof. A sleeve shaft 67 rotatably registers with the axle 66 and is provided with an enlarged head 68 at one end and has a gear 69 formed at the other end thereof. A gear 70 engages the gear 65 and is rotatably journalled on the shaft 67 and has a well 71 formed therein in which the head 68 nests and limits the axial movement of the gear 70. A friction annulus or washer 72 registers with the shaft 67 and abuts the inner end face of the gear 70.

Encircling the shaft 67 and entrapped between the confronting end faces of the annulus 72 and the gear 69 is a helical compression spring 73. The ends of the springs 73 are bent to form axially parallel legs 74 and 76, the leg 74 engaging a bore 77 formed in the annulus 72 and the leg 76 engaging a bore 78 in the gear 69. A gear 79 engages the gear 69 and is connected by way of a shaft 80 to a drive motor or a manually rotatable member. The operation of the device last described is similar to that first described, differing therefrom in that there is a positive connection between the ends of the compression spring 73 and the friction annulus 72 and gear 69. Thus the only slipping interface which controls the maximum transmittable torque is between the annulus 72 and the gear 70. As a consequence the maximum torque may be closely controlled and is uniformly maintained.

Referring now to FIGURES 8 and 9 of the drawing which illustrates an alternative type of torque limiting coupling mechanism which may be employed to advantage, the reference numeral 79 designates a sleeve shaft supported in the manner of the sleeve shaft 67 of the last described embodiment and terminating at one end in an enlarged head 80 and at the other end in a driven gear 81. Journalled on the shaft 79 and restricted against the axial movement by the head 80 is a gear 82 which engages the zoom lens control gear. A friction annulus 83 having a larger aperture than the shaft 79 registers with the shaft 89 and bears on the inner end face of the gear 82. A crescent shaped opening 84 is delineated by the confronting peripheral faces of the shaft 79 and annulus 83 and a roller 86 in the form of a ball is located in the space 84. The diameter of the ball 86 is about equal to or slightly less than the maximum or medial width of the crescent space 84. A helical compression spring 87 registers with the shaft 79 and is entrapped between the confronting faces of the annulus 83 and the gear 87.

The coupling mechanism last described is employed in the manner of that earlier described. In operation the spring 87 urges the annulus 83 into frictional engagement with gear 82. The roller 86 permits axial movement of the annulus 83. However, upon rotation of the shaft 79 in either direction, the roller 86 is advanced in the same direction along the space 84 to a wedged position releasably locking the annulus 83 and shaft 89 against relative rotation. The annulus 83 is thus positively coupled to and driven by the shaft 79. The annulus 83 in turn friction drives the gear 82 and limits the torque transmitted thereto to thereby minimize any mechanical shock in the operation of the associated apparatus, as aforesaid. The only torque determining parameter is the interface friction between the annulus 83 and the gear 82.

While there have been described and illustrated preferred embodiments of the present invention, it is apparent that numerous alterations, omissions and additions may be made without departing from the spirit thereof.

What is claimed is:

1. In combination with a zoom lens including a barrel provided at its rear end with a coaxial rotatable lens control first gear and a selectively controllable rotary drive member, a slipping clutch assembly coupling said drive member to said control gear comprising a second gear coaxial with said drive member and engaging said first gear and having an end face confronting said drive member, a friction annulus engaging said end face, and a helical compression spring entrapped between said annulus and said drive member and urging said annulus toward said end face.

2. The combination of claim 1, wherein the ends of said compression spring are affixed to said annulus and drive member respectively.

3. The combination of claim 1 comprising an axle, said drive member including a hollow shaft rotatably mounted on said axle and having a second annulus affixed to its trailing end, said second gear and friction annulus being rotatably mounted on the leading end of said hollow shaft and said spring registering with said hollow shaft and having opposite ends connected to said friction annulus and second annulus respectively.

4. The combination of claim 3 wherein said second annulus comprises a third gear, and including a motor provided with a drive shaft, and a fourth gear mounted on said motor drive shaft and engaging said third gear.

5. The combination of claim 1 comprising an axle said drive member including a hollow shaft mounted on said axle and having a second annulus affixed to its trailing end, said second gear and friction annulus being rotatably mounted on the leading end of said hollow shaft and said friction annulus having an inside diameter greater than the outside diameter of said hollow shaft, said spring registering with said hollow shaft and having an end projecting between said friction annulus and said hollow shaft.

6. The combination of claim 5 wherein said second annulus comprises a third gear, and including a motor provided with a drive shaft and a fourth gear mounted on said motor drive shaft and engaging said third gear.

References Cited

UNITED STATES PATENTS

| 2,600,636 | 6/1952 | Goetz | 192—33 |
| 2,924,146 | 2/1960 | Back | 95—45 X |

JOHN M. HORAN, *Primary Examiner.*